(12) United States Patent
Zanchetta et al.

(10) Patent No.: US 7,115,313 B2
(45) Date of Patent: *Oct. 3, 2006

(54) SELF-ADHERING MODIFIED BITUMEN UNDERLAYMENT FOR METAL ROOFS

(75) Inventors: Natalino Zanchetta, Reno, NV (US); Shaik Mohseen, Mountain Top, PA (US)

(73) Assignee: Polyglass U.S.A., Inc., Hazleton, PA (US)

( * ) Notice: Subject to any disclaimer, the term of this patent is extended or adjusted under 35 U.S.C. 154(b) by 17 days.

This patent is subject to a terminal disclaimer.

(21) Appl. No.: 10/776,868

(22) Filed: Feb. 11, 2004

(65) Prior Publication Data

US 2004/0161570 A1    Aug. 19, 2004

(51) Int. Cl.
*B32B 11/04* (2006.01)

(52) U.S. Cl. .................. 428/40.1; 52/177; 52/181; 428/40.2; 428/40.3; 428/41.5; 428/141; 428/143; 428/147; 428/354

(58) Field of Classification Search ............... 428/40.1, 428/40.2, 40.3, 41.5, 141, 143, 147, 354; 52/177, 181
See application file for complete search history.

(56) References Cited

U.S. PATENT DOCUMENTS

| | | | | |
|---|---|---|---|---|
| 4,992,315 A | * | 2/1991 | Zickell et al. | ............. 428/40.3 |
| 5,686,703 A | * | 11/1997 | Yamaguchi | ................. 174/259 |
| 5,916,654 A | * | 6/1999 | Phillips et al. | ............. 428/42.2 |
| 6,284,820 B1 | * | 9/2001 | Braga et al. | .................. 524/70 |
| 6,641,896 B1 | * | 11/2003 | Fensel et al. | ................ 428/141 |
| 6,696,125 B1 | * | 2/2004 | Zanchetta et al. | ......... 428/40.1 |

* cited by examiner

*Primary Examiner*—Nasser Ahmad
(74) *Attorney, Agent, or Firm*—David I. Roche; Baker & McKenzie LLP

(57) ABSTRACT

A self-adhering modified bituminous underlayment for metal roof assemblies that comprises an APP modified bitumen compound on the front side, and a factory-applied self-adhesive compound on the back side of a reinforcement carrier sheet, and a fabric at least partially embedded in the APP modified bitumen compound to provide a non-skid surface. A method of manufacturing such composite comprising coating an APP compound on the top surface and affixing a self-adhesive compound to the bottom surface of a reinforcement carrier support sheet, and applying a release liner to the tacky self-adhesive layer during manufacture, stripping the release liner, selvage release film and end lap film from the membrane immediately prior to use, subsequently placing the surface of the membrane directly on to the upper surface of the roof deck, base sheet or underlayment, and applying force directly to the sheet to enhance the bond between the composite and the underlying surface that is created by the tacky self-adhesive compound. The present invention relates generally to residential roofing assemblies using metal as the surface.

39 Claims, 2 Drawing Sheets

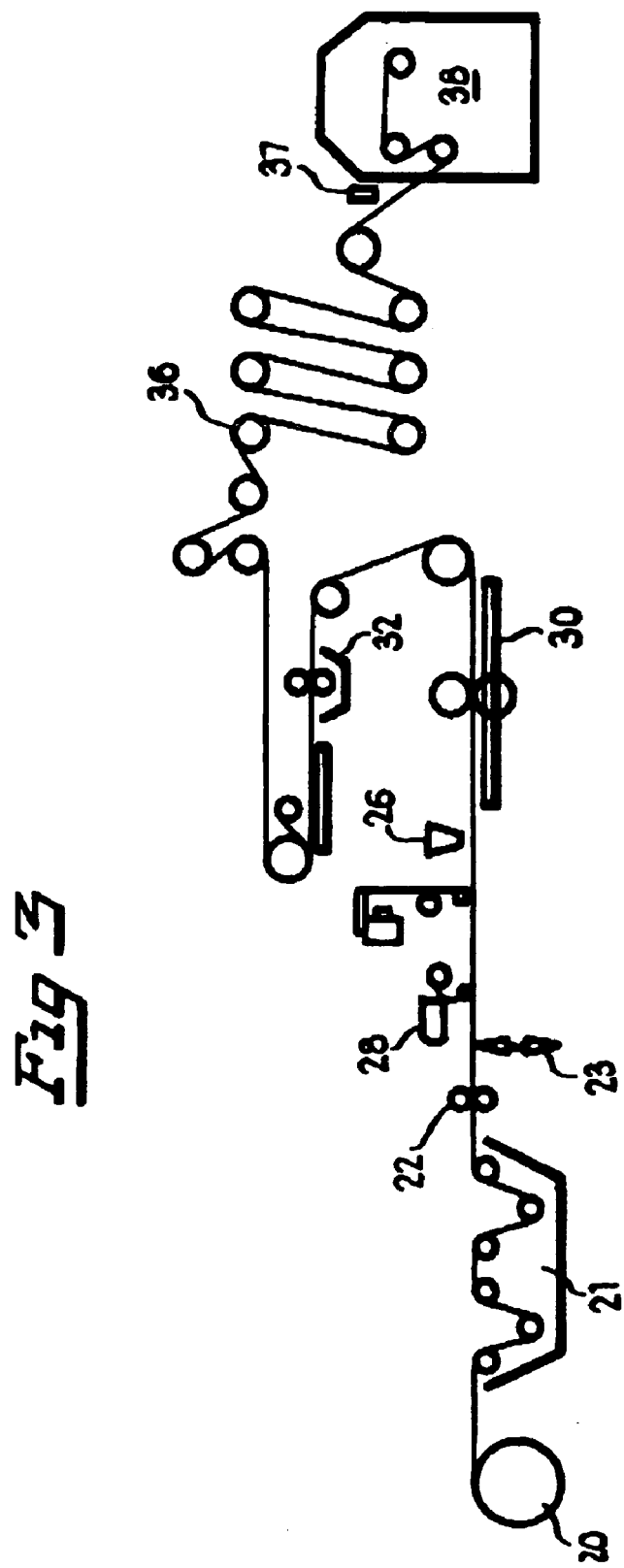

US 7,115,313 B2

SELF-ADHERING MODIFIED BITUMEN UNDERLAYMENT FOR METAL ROOFS

RELATED APPLICATION

This application claims the benefit of a previously filed patent application entitled "Self-Adhered Modified Bitumen Roofing Material" filed on Apr. 25, 2002 and assigned Ser. No. 10/131,842, now U.S. Pat No. 6,696,125.

BACKGROUND AND SUMMARY OF THE INVENTION

This invention relates to bituminous roofing adapted for the waterproofing and sealing of substrate structures and to the method of manufacturing such materials. More particularly, the present invention is in the field of roofing underlayments, having a factory-applied self-adhesive layer on the bottom surface and a thermoplastic modifier such as atactic polypropylene modified bituminous compound on the top surface in order to provide easy and hassle-free field application by roofing personnel.

It is well known to use bituminous compositions for manufacturing waterproofing membranes, generally for roof covering and roofing underlayments. Modified bituminous prepared roofing, also referred to as modified asphalt roofing membrane, is typically manufactured using, as a core, a reinforcement carrier support sheet made of fabric such as polyester, fiberglass, or a combination of both, saturating and coating the front and back sides of the carrier with a modified bituminous coating material based on Atactic Polypropylene (APP), Amorphous Poly Alpha Olefin (APAO), Thermoplastic Polyolefin (TPO), Styrene-Butadiene-Styrene (SBS), Styrene-Ethylene-Butadiene-Styrene (SEBS), synthetic rubber or other asphaltic modifiers, that will enhance the properties of asphalt.

Roofing membranes are used in commercial, industrial and residential applications. Two major classifications of modified bitumen roofing materials, which are used mostly in industrial and commercial applications are (1) cap sheet and (2) base sheet. Shingle roofing materials, however, are used primarily in residential applications, and are exposed to the elements, and hence can be considered as 'cap' as well. A cap sheet or shingle membrane can be modified using Atactic Polypropylene (APP), Amorphous Poly Alpha Olefin (APAO), Thermoplastic Polyolefin (TPO), Styrene-Butadiene-Styrene (SBS), Styrene-Ethylene-Butadiene-Styrene (SEBS), synthetic rubber or other asphaltic modifiers, and is generally reinforced with a polyester carrier or a combination of polyester and fiberglass. These sheets can be smooth or granular surfaced and are typically greater than 2.8 mm in thickness. The top surface of the cap sheet is exposed to the elements and hence the name "cap". A base sheet is typically modified using any of the same modifiers as a cap sheet, but due to economic considerations, is modified using smaller quantities of less expensive polymers such as Atactic Polypropylene (APP) or Styrene-Butadiene-Styrene (SBS). A base sheet is generally reinforced with a fiberglass carrier (which costs significantly lower than polyester) and is smooth surfaced. The thickness of such base sheet typically ranges from 1.0 mm to 2.5 mm depending upon the job specifications. In a typical field installation, a base sheet is first applied to the roof deck using mechanical fasteners, via hot mopping or using cold application techniques. Cap sheets or shingles are applied on top of the base sheets, with the seams of adjacent rolls in offset relation. Most APP-modified bitumen membranes are torch-applied, i.e., by heating the back side of the sheet to melt the compound and using the molten compound to form a heat weld. Most SBS-modified bitumen membranes are set during in-field application in hot mopping asphalt, torch-applied or adhered with cold-process adhesives, as described in U.S. Pat. No. 5,807,911 issued to Wentz, et al., on Sep. 1, 1992. Modified bitumen membranes which do not have factory-applied granule or foil surfacing need some form of field-applied ultraviolet protective coating.

Of the two general types of bituminous sheet materials used for roofing applications, i.e., bitumen-SBS and bitumen-APP materials, the bitumen-SBS products are more elastic, with greater flexibility at low temperatures. APP-based products, however, are more heat-resistant (due to a higher softening point), are more resistant against the effects of the atmosphere (especially ultra-violet rays) and more resistant to foot traffic The manufacture of bituminous roofing material with multiple layers is well known. For example, U.S. Pat. Nos. 2,893,889; 4,755,409; 4,871,605; and EP Patent No. 903435 disclose membranes comprised of a core and a plurality of different layers of waterproofing material. The '409 patent also discloses a release sheet applied to the one side of the membrane for purposes of protection. Products are in the market which combine the more flexible and elastic bitumen-SBS upper layer with a self-adhesive lower surface. An example of such a product is Plura AD self-adhesive sold by Pluvitec S.p.A., described on the website of the seller at http://www.pluvitec.com. Application of a primer is recommended when using this material in order to ensure adherence of the self-adhesive layer to a substrate, and the use of added heat, i.e., by a torch, is also recommended.

Roofing underlayment materials are used in roofing systems such as modified bituminous roofing membranes as well as shingles, tiles, slates, cedar and metal roofing. Some underlayments such as asbestos fiber roofing felts were used during the early part of the 20$^{th}$ century but are no longer used due to health hazards associated with asbestos fibers. The most commonly used underlayment is asphalt-saturated roofing felt, commonly known as No. 15, No. 30 or No. 50 felt. These have been in use for a very long time and are the least expensive form of underlayment available. Roofing felt is made from a base sheet made of paper coated with filler-modified asphalt and as such is very inexpensive. Several roofing companies produce such materials. The main objective of using felt is to provide a protective barrier on the deck when applying roofing membranes by means of hop mopping, torching or self-adhesive applications. Several building code bodies such as Miami Metro Dade County authority dictates the use of slip sheet in all roofing applications under its jurisdiction. This is to ensure that the roof deck such as plywood is not damaged during 'roof tear off' when replacing the roof.

Roofing felts have been in short supply periodically and due to supply-demand factors, the price of felt has continued to rise over the years. Interestingly, felts have several limitations. It is well known that roofs undergo significant expansion and contraction as they heat and cool throughout the day. Because of such thermal cycling, felts experience shrinkage when exposed to the elements and exhibit deterioration in a relatively short period of time. Moreover felts are not watertight when roofing nails or staples are driven through them, making it necessary to cover the felt underlayment with the next course of roofing material immediately upon installation of the felt to the deck. These limitations, coupled with frequent shortage of felt underlayments, have forced roofers and contractors to search for alternate materials. Sheets which are sold as membranes in roll form may be cut into smaller sections to form shingles for use on roofs with greater slope. Shingles are typically nailed into place, and are most commonly used in residential roofing.

Another category of roofing membranes are "underlayments", which are widely used in residential applications, and may also be designed for use in regions with colder climates, where ice-dam protection is required. Underlayments, commonly utilized under shingle roofing material, metal roofing panels or tile roofing, provide waterproofing characteristics and are typically reinforced with fiberglass. However, there are a few products in the market place that have no carrier such that these consist of simply a coating of self-adhesive compound on a polyolefinic film. Polystick P made by Polyglass USA, Grace Ice & Water Shield and Grace Vycor Ultra manufactured by W. R. Grace & Company are examples of such materials. These non-carrier based underlayments are typically very soft and are ideally suited for use in areas of roofs such as perimeters, hips, valleys, etc. where ice dam formation may occur during winter.

Roofing underlayments are applied to the underlying substrates using a variety of methods. One such technique is using mechanical fasteners, which is a slow and cumbersome process. During installation of a roof, roofing underlayments are attached to the wood deck by 'mechanically fastening' using roofing nails or staples. Based on the roof specifications, another course of material such as No. 90 felt is applied on top of the No. 15 or No. 30 felt, usually via hot asphalt mopping. Upon installation of such underlayment, metallic panels may be mechanically fastenedon the top surface Hot mopping, in which drums or cartons of hot asphalt are used, although poses a reduced risk of fire versus torch application, still poses an operational problem. Hot-mopping application, which requires a fair amount of labor, especially in larger projects, also results in waste cartons with chemical residue. These dirty cartons must be disposed of properly, for example, in landfills, and become unsafe for the environment. In addition, disposal of the waste materials become costly and labor-intensive. Alternatively, hot asphalt is directly pumped to the roof from the ground using a hose. Whereas this method eliminates the aforementioned problems associated with disposal of cartons, etc., it poses other problems in that it is very difficult and dangerous to pump hot asphalt to the roof level, especially in the case of high-rise buildings. Furthermore, the end result of the above-described in field applications is also not successful each and every time. Moreover these products are based on application methods that pose environmental and operational hazards during the roof installation.

There are several non-felt, modified bitumen based materials that are designed to be used under metal roofing. All of these materials are based on SBS modified bituminous compound. Examples of such products are 'Tile and Metal Underlayment' manufactured by Tamko Roofing Company of Joplin, Missouri and 'Grace Vycor Ultra' manufactured by W. R. Grace and Company of Cambridge, Mass. It is essential to note that metal generates excess heat and therefore necessitates the use of an underlayment that can withstand high temperature. Also granular surfaced products, whether APP or SBS based, are not recommended since the mineral surface can cause abrasion on the metal. This poses severe problems for the installer of such roofing underlayments in that these products are modified with styrene-butadiene-styrene (SBS) compound, which is soft and flows at temperatures above 110 degrees Celsius. Hence it is necessary to develop a product that is very easy to install as well as durable enough to offer high heat resistance and a non-abrasive surface on the exposed side. Such material must also be economical, thereby making use of commercial roofing membranes as underlayment materials cost prohibitive.

There is, therefore, a need to provide a self-adhering metal underlayment material, which reduces labor and installation costs, reduces VOCs and emissions from hot mop applications and eliminates the need for use of nails. The present invention permits a more simplified, safer and economical roof installation without compromising structural integrity and lap sealing capabilities. It also offers a suitable means to dramatically reduce field labor by offering a 'dual compound' product, which eliminates the numerous undesirable aspects of the prior art.

One object of the present invention is to provide membranes with well-embedded, non-abrasive, high temperature resistant fabric surface that is highly durable. Fabric surfacing is applied to the upper surface of the top asphaltic coating layer to impart weathering, high temperature resistant characteristics and skid resistant characteristics.

It is still another object of the present invention to provide a unique APP modified bitumen compound on the top surface that is very "hard". When metal panels heat up during the daytime, especially in summer, heat is transferred to the underlayment below. This transfer of heat softens the modified compound, more profoundly in the case of SBS, which is by far the preferred modifier in most existing underlayments, and causes the compound to flow. Use of a hard APP compound alleviates this problem. APP modified compound utilized on the top surface offers plastomeric characteristics to the bitumen and makes the membrane very hard and imparts improved flow resistance at high temperatures. A typical softening point temperature of APP modified compound is in excess of 150 degrees Celsius, whereas that of conventional SBS modified compound is approximately 120 degrees Celsius.

The present invention deals with metal underlayment sheet based on dual compound technology whereby an APP compound is applied on the top surface of the reinforcement and a self-adhesive compound is applied on the bottom surface of the reinforcement. Dual compound technology allows enhanced adhesion of the tacky self-adhesive material to the roof deck because the self-adhesive compound is applied in the factory under controlled conditions rather than in the field where contamination and variation in application techniques are considerably more of a problem.

This invention specifically deals with applying a "dual compound" to the reinforcement carrier sheet—a compound based on Atactic Polypropylene (APP) or Amorphous Poly Alpha Olefin (APAO) or Thermoplastic Polyolefin (TPO) on the top surface, and a separate heat-and-pressure-activated adhesive compound to the bottom surface of the reinforcement carrier sheet. APP modified bitumen compound by itself does not possess any adhesive properties to directly adhere to any substrate. Similarly, self-adhesive compounds have "very poor" weathering characteristics, thereby undergoing premature degradation with exposure to the elements. Dual compound combines the best of an APP and a self-adhesive compound. The advantage of a "dual" compound is the ability to add a "true" roofing compound such as an APP modified bitumen on the top (weathering) surface and a self-adhesive compound on the bottom surface. The thickness of such cap membranes is between 1.0 mm and 3.0 mm. Typical weight of a one square roll (1 roofing square equals 107.6 square feet) is between 60 pounds and 80 pounds, depending upon thickness of the membrane. Such membranes may be reinforced with a polyester, fiberglass or polyester/fiberglass combination mat. Generally, fiberglass is used as a carrier in tile underlayment sheets due to their low cost. A release liner, typically made of polypropylene, polyethylene or polyester, of thickness ranging from 40 to 80 microns, and treated with a silicone adhesive on one side (the side that comes in contact with compound), is applied to the self-adhesive compound to prevent sticking of adjacent sections of the roofing material and to the packaging when the finished membrane is stored and transported in the form of rolls.

The present invention involves roof underlayment sheets having a top layer of an APP modified bituminous compound, whose composition utilizes bitumen (asphalt), APP plastomeric modifiers and fillers, and a bottom layer of a self-adhesive compound, whose composition utilizes bitumen (asphalt), elastomeric modifiers, tackifying resins, and fillers. A typical APP compound may contain 5% to 25% of polypropylene modifiers, 8% to 70% of filler such as limestone or talc, and remaining portions of asphalt. In order to achieve fire ratings as classified by Underwriters' Laboratories (UL), special fire retardant additives may be used as filler. A typical self-adhesive compound may contain 3% to 10% of Styrene-butadiene-styrene modifiers, 0% to 5% of Styrene-isoprene-styrene modifiers, 6% to 25% of hydrocarbon tackifying resins, 8% to 40% of filler such as limestone, talc, fly ash, volcanic ash, graphite, carbon black, silica or china clay, and remaining portions of asphalt.

The inventive membrane has a carrier that supports a dual compound modified asphalt, namely, an APP modified asphaltic compound which is positioned on top of the carrier sheet, and a self-adhesive modified asphaltic compound which is positioned below the carrier sheet. The adherent material serves to affix the metal underlayment material to the base sheet or roof deck. In order to provide adhesion and a watertight seal, a self-adhesive compound that is compatible with the modified bituminous coating layer must be utilized. The factory-applied self-adhesive compound provides an adhesive layer to the underlayment sheet having sufficient surface tack ("quick grab"), as well as adequate strength for use in adhering the underlayment sheet to an underlying surface such as roofing felt or deck.

In the case of metal underlayments, a suitable surfacing agent such as a non-woven fabric material is applied to the upper surface to achieve non-skid properties in addition to high temperature resistance. If the top surface is too smooth, it may not provide the necessary skid resistance for the installer of the product. Hence it is essential to have a coarser surface on the exposed side. Fabrics have a rough texture that provides a measure of skid resistance. Fabrics are used in a variety of applications including roofing membranes, furniture, etc. and are usually made of polyester, polypropylene or polyethylene. Apex Inc. of Georgia, Spun Indo Jaya of Indonesia and Texbond of Italy are sources of such lightweight fabrics. During manufacture of fabrics, surfactants are added to aid in processing the material. Such additives can interfere with lamination of the fabric to the modified bituminous compound during manufacture, and hence it is important that the fabric materials have minimum level of surfactant. When selecting fabric for this lamination to the top side of the APP modified bituminous compound, it is critical to note that the fabric must not be too thick that it may not get sufficiently laminated to the modified bituminous compound. For the manufacture of the inventive metal underlayment material, fabric based on polypropylene is chosen. Polypropylene fabrics are lightweight, readily available and are economical. PP fabric selected for this lamination was of unit weight ranging from 22 to 30 grams/meter$^2$ in order to facilitate ease of lamination to the modified bituminous compound. Whereas the color of the fabric does not affect skid resistance, lighter color fabrics possess higher reflectivity and thereby maintain the underlayment surface cooler. Metal underlayments surfaced with darker colored fabrics absorb more heat and hence the APP compound gets softer. It is therefore preferable to use lighter color fabrics for metal underlayment applications.

Another suitable surfacing agent that can be applied to the upper surface is film material. Such film material must have treatment on the exposed surface to achieve non-skid properties. If the top surface is too smooth, it may not provide the necessary skid resistance for the installer of the product. Hence it is essential to provide a non-skid treatment on the exposed side. Such film must also exhibit high temperature resistance and resistance to the harmful effects of sun's ultraviolet rays. Polyolefinic films are used in a variety of applications including roofing membranes, food packaging, grocery bags, etc. and are usually made of polypropylene or polyethylene. PCL Packaging of Massachusetts, Sipa of Italy, and Cartenplast of Italy are sources of such films. During manufacture of these films, anti-skid additives can be incorporated to aid in providing skid resistance properties. When selecting film for laminating to the upper side of the modified bituminous compound, it is critical to note that the film must not be too thick that it may not get sufficiently embedded in the modified bituminous compound. For the manufacture of the inventive metal underlayment material, film based on polyethylene is chosen. Further high density polyethylene (HDPE) is preferred for this application. Polyethylene films are readily available and are economical. HDPE film selected for this lamination was of thickness ranging from 2 mil (50 microns) to 4 mil (100 microns) in order to facilitate ease of lamination to the modified bituminous compound. However the preferred thickness is 2.8 mil (70 micron). Whereas the color of the film does not affect skid resistance, lighter color fabrics possess higher reflectivity and thereby maintain the underlayment surface cooler. Metal underlayments surfaced with darker colored fabrics absorb more heat and hence the modified bituminous compound gets softer. It is therefore preferable to use lighter color films for metal underlayment applications. The HDPE film of the present invention is treated with an anti-skid coating on the upper surface. Such coating is usually in the form of straight lines or a geometric pattern and consists of adhesives such as Ethyl Vinyl Acetate (EVA), Amorphous Poly Alpha Olefin (APAO), PolyAmide or Pressure Sensitive Adhesives (PSA). For this invention, an EVA adhesive called Jowatherm Hot Melt Adhesive from Jowat Corporation, North Carolina was chosen.

Metal underlayment of the present invention is also suited for use as an underlayment in roofing tile applications. However non-woven fabrics have low strength and as such may be unable to resist movement of tiles on rooftops (such as groups of tiles stored during assembly or simply the tiles on steeper roofs). Whereas non-woven polypropylene fabric is used as the top layer in laminate in the case of metal underlayment, a stitch-bonded polyester fabric is the preferred choice for the top layer of the laminate for the metal underlayment when the same will be employed as a roofing tile underlayment. Stitch-bonded polyester is lightweight as well but possesses very high tear strength due to its process of manufacture and unique construction. Tie-Tex International of South Carolina is a leading manufacturer of such material. When metal underlayment of the present invention is manufactured using stitch-bonded polyester on the upper surface, the resultant material is well suited for use as a roofing tile underlayment as well.

BRIEF DESCRIPTION OF THE DRAWINGS

FIG. 3 is a view of the dual-compounding composite sheet manufacturing process.

DETAILED DESCRIPTION

In one preferred embodiment, the metal underlayment material is a dual compound composition constructed of a first APP modified asphaltic layer on the front side of the carrier sheet and a second self-adhesive asphaltic layer on the back side of the carrier sheet. The second asphaltic layer is very adherent and provides excellent adhesion of the membrane to the underlying surface.

Figure 1:
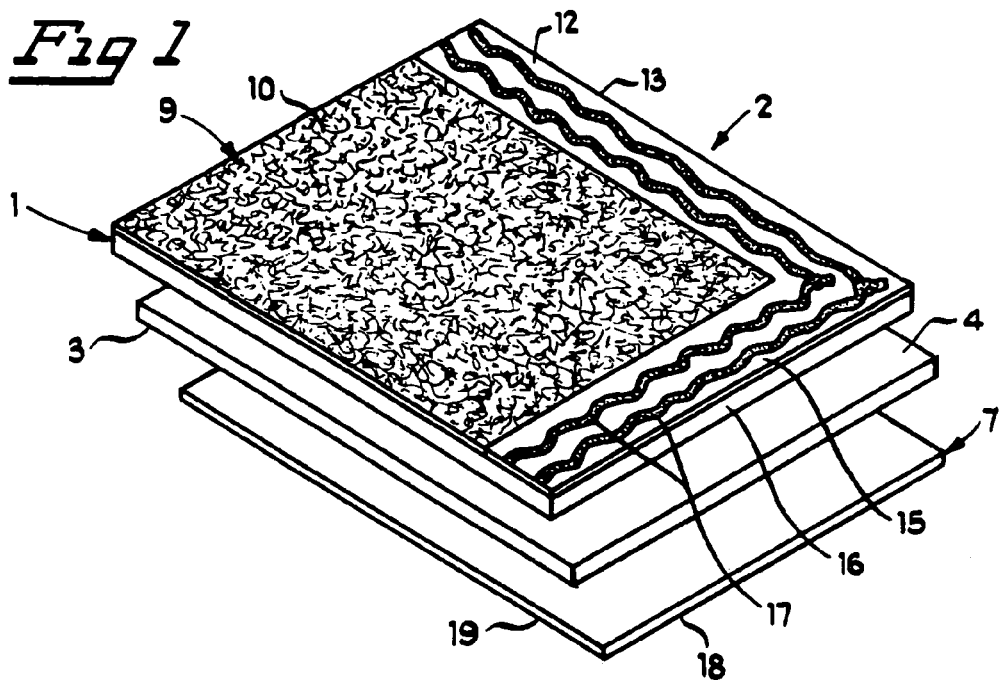
FIG. 1 is an exploded view of the metal underlayment sheet.

Referring now to the drawings, FIG. 1 represents a bituminous self-adhesive metal underlayment material constructed in accordance with the present invention and is shown in an exploded view. The composite sheet 2 is made with modified asphalt coatings and a reinforcing carrier sheet 4. Specifically, composite sheet 2 includes a reinforcing carrier 4 sandwiched between top and bottom layers, 1 and 7, respectively, of modified bitumen coatings, which form oppositely exposed upper and lower surfaces, 9 and 18, respectively, of the composite sheet 2. The bottom layer 7 has an adhesive polymer-modified compound that constitutes a non-weathering surface adapted to be secured to the underlying surface. The top layer 1 is an APP compound (described in detail later in the description) and the bottom layer 7 is a separate, but compatible, self-adhesive compound (also described in detail later in the description). Between the top and bottom layers, 1 and 7 respectively, is a reinforcing carrier sheet core 4, preferably made of a fiberglass substrate. Alternatively, the reinforcing carrier sheet 4 may be formed of a polyester substrate or a composite material that is a combination of both polyester and fiberglass creating a stronger reinforcement carrier sheet 4. As will become hereinafter apparent, the lower surface 18 of the bottom layer 7 is a non-weathering surface adapted to be adhered directly to the underlying surface. Surfacing agent such as fabric, 10, is applied to the upper surface of the top asphaltic coating layer 1 to impart weathering properties as well as high temperature and skid resistant characteristics.

Positioned on the lower surface 18 of the bottom adhesive asphaltic layer 7 is a release liner 19 of preferably silicone treated polypropylene, polyethylene or polyester release liner 19. Of course, during application to the underlying surface or roof deck, the release liner 19 is removed, thereby allowing the sticky lower surface of the composite to adhere to the roof. The top APP compound layer 1 of the composite sheet 2 can be surfaced with a protective layer of surfacing agent 10, such as fabric, as shown in FIG. 1. This upper surface 9 constitutes a skid resistant surface.

The top APP compound layer 1 of the present invention is characterized in that it comprises a mixture consisting of the following: 5% to 25% of a mixture of polypropylene modifiers comprising of (a) isotactic polypropylene; (b) ethylene-propylene copolymer; (c) atactic polypropylene; and (d) polyethylene, preferably film grade material, 8% to 70% of filler such as limestone, talc, fly ash, volcanic ash, graphite, carbon black, silica or china claygraphitetalcum, and 45% to 75% of asphalt. Polyethylene used in the APP formulation can be high density polyethylene (HDPE) or low density polyethylene (LDPE), virgin or recycled material. APP formulations may be adjusted slightly to account for seasonal temperature fluctuations, such as, very hard compound to be used during summer months and a compound with medium hardness to be used during the winter months. In the place of APP, commercially available Thermoplastic Olefin (TPO) can be substituted as well. Such a mix should have a viscosity of 2,000 to 20,000 cPs at 180 degrees Celsius, a ring and ball softening point temperature greater than 130 degrees Celsius, and a needle penetration value of 65 dmm at 60 degrees Celsius for the dual compound cap sheet, and less than 50 dmm at 60 degrees Celsius for the tile underlayment and metal underlayment, with a preferred range of 40 to 140 dmm. All tests values are determined using appropriate ASTM test methods and standards. The APP compound can contain a tackifying resin in amounts ranging from 0% to 2% to improve adhesion at lap joints. Additionally, in order to achieve fire ratings as classified by Underwriters' Laboratories (UL), special fire retardant additives may be used as filler material. Typical fire retardants employed include calcium borate, magnesium borate, a mixture of antimony tri-oxide and deca bromo diphenyl oxide, etc. These are used as replacement for existing filler material such as limestone, talc, fly ash, volcanic ash, graphite, carbon black, silica or china clay or in conjunction with these filler materials. A minimum of 10% of the fire retardant material is required to achieve the desired performance during fire testing.

The bottom adhesive layer 7 of the dual-compound asphaltic coating is an aggressive adhesive layer that is applied on the backside 3 of the carrier sheet 4. The bottom adhesive layer 7 should possess a reasonable shelf life and excellent adhesion characteristics and have sufficient surface tack for rooftop installation but yet should not be too sticky that one cannot remove the release liner 19 at high temperatures. The bottom adhesive layer 7 generally comprises a mixture of the following ingredients: 3% to 10% of styrene-butadiene-styrene copolymer, 4% to 11% of styrene-isoprene-styrene copolymer, 20% to 33% of hydrocarbon tackifying resins, 0% to 15% of mineral stabilizers such as limestone or talc, and the balance being asphalt, having a needle penetration value of at least 140 dmm at 25 degrees Celsius using relevant ASTM test method. Preliminary results have revealed that the pre-applied adhesive membranes provided adhesion as good as resulted from field application using conventional application methods such as hot mopping or cold application. Such results demonstrate that self-adhering composite sheets of the present invention and the method thereof provide overall excellent adhesion between the composite sheets and the underlying surface as well as a less labor-intensive application means in addition to elimination of emission of VOCs as compared to the existing state of the art.

A release liner 19, as described below, can be adhered to the self-adhesive compound bottom layer 7 to protect the adhesive properties during production, transportation and storage of the composite sheets or membranes. The release liner 19 is typically a polyester, polypropylene or polyethylene film that is 40 to 70 micron in thickness and siliconized on the surface that contacts the self-adhesive compound bottom layer 7. Optionally, a siliconized kraft paper or a composite of paper and film can be adhered to the adhesive portion of the composite sheet 2. The release liner 19 is removed prior to use of the composite sheet 2 to allow the adhesive portion to be adhered to a roof surface or other underlying surface. It is preferred that the release liner 19 be of white color on the side so as to reflect solar energy and thereby keep the adhesive bottom layer 7 relatively cool.

With the adhesive bottom layer 7 being pre-applied, all that is required at the jobsite is for the applicator to unroll the composite sheet and position it, fold one-half of the rolled out membrane back and strip away the release liner 19, place the adhesive bottom layer 7 onto the roof, and then apply pressure which can be accomplished merely by rolling using a metal roller that is at least 80 lbs in weight, and finally, folding the other half and removing the release liner 19, and adhering this section to the underlying surface as stated above.

Figure 2:
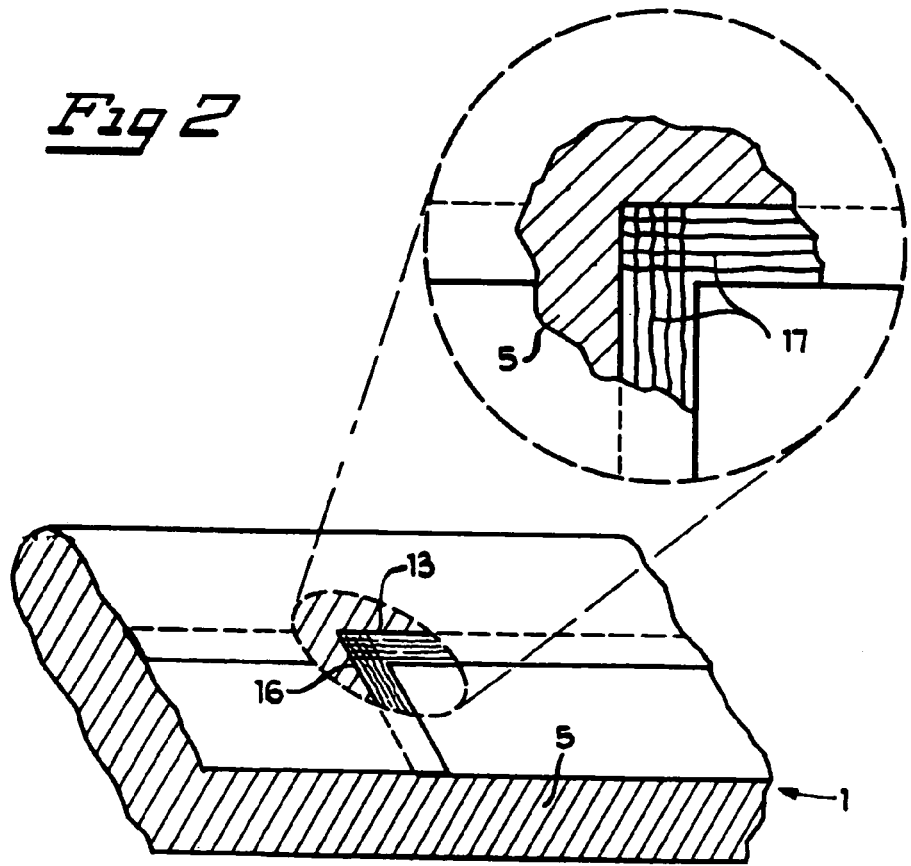
FIG. 2 is a top view of the composite sheet on a roofing substrate structure.

Referring now to FIG. 2, the composite sheet 2 is shown as applied to the underlying surface, which can be the roof deck itself or another base sheet or underlayment. The composite sheet 2 is shown with a cut-out exploded view illustrating the side lap 13. The side lap 13 runs longitudinally along one lengthwise edge of the composite sheet 2. As illustrated, the composite sheet 2 is applied to the underlying surface 5 in successive rows. The composite sheet 2 can be adhered to each other along the side lap 13 to create a watertight or connecting bond between successive or adjacent composite sheets 2.

FIG. 3 illustrates the process of manufacture of a dual compound modified bitumen composite sheet 2. One or more reinforcement carrier sheets 4, which may be polyester, fiberglass, or a polyester/fiberglass combination, is unwound from a mat unwinding station 20, and saturated with the APP modified bitumen compound top layer 1 in the saturation tank 21. Coating thickness is controlled using calender rolls 22 immediately after the saturated carrier sheet 4 comes out of the saturation tank 21. For this invention, compound from the carrier sheet back side 3 is scraped off using a scraper 23 in order to facilitate application of the self-adhesive compound bottom layer 7 on the carrier back side 3 of the carrier sheet 4 during a later stage in the manufacturing process. Directly following these applications, surfacing agent 10 (fabric) is applied using the surfacing applicator 26. After the surfacing application process, the composite sheet 2 undergoes cooling by traveling on a chilled water bath 30 and over cooling drums and typically is cooled to about 95 degrees Celsius. After traveling through a series of turns and gears, the composite sheet 2 is inverted such that the upper surface of the composite sheet 2 is now on the bottom side, and at about 160 degrees Celsius, the self-adhesive compound bottom layer 7 is applied at the coating vat 32. Following the self-adhesive bottom layer 7 application, the composite sheet 2 travels over a cooling belt to permit cooling of the self-adhesive compound. A release liner 19 is applied to the self-adhesive compound bottom layer 7 using the release liner applicator 34. Then, the composite sheet 2 travels through the accumulator 36 to the winder 37 where it is cut to the required length and wound into rolls.

In another embodiment of the present invention, a siliconized polyester film, called selvage release film 12, that is approximately 3 to 4 inches in width, is placed along the length of the roll on one side of the composite sheet 2, forming a side lap 13. This allows for overlapping one roll over anotherwidthwise. At the time of roof covering installation the selvage release film 12 is removed.

A siliconized polyester film tape, called selvage film, that is typically 3 to 4 inches in width is applied on the selvage of the sheet using a selvage film applicator (4).

It is preferable that the metal underlayment of the present invention has a thickness of 2.0 mm and a unit weight of 70 lbs/100 square feet. Preferably, the metal underlayment will also have the following: minimum tensile strength of 25 lbs in the longitudinal and transversal directions when tested according to ASTM D2523, minimum elongation to break of 5% in the longitudinal and transversal directions when tested according to ASTM D2523, minimum tear strength of 20 lbs when tested according to ASTM D4533 and pass nail sealability test when tested according to ASTM D1970.

While specific embodiments of the inventions claimed below have been shown and described herein, it should be recognized that numerous alternatives, modifications, and variations of the embodiments shown and described may be readily made by persons of ordinary skill in the arts to which the inventions pertain, and such persons may devise a number of such alternatives, modifications, and variations of the embodiments shown and described herein without departing from the spirit and scope of the appended claims.

What is claimed is:

1. A self-adhering underlayment for metal roofing assemblies comprising:
   a dual-compound composite sheet having a carrier sheet with a front side and a back side, the carrier sheet being sandwiched between a top layer and a bottom layer:
   the top layer comprised of a mixture of: (a) polypropylene modifiers comprised of isotactic polypropylene, ethylene-propylene copolymer, atactic polypropylene and polyethylene, (b) filler, and (c) asphalt;
   the bottom layer comprised of heat-and-pressure activated self-adhesive compound comprised of a mixture of: (a) styrene-butadiene-styrene copolymer, (b) styrene-isoprene-styrene copolymer, (c) hydrocarbon tackifying resins, and (d) asphalt; and
   the top and bottom layers forming oppositely facing upper and lower surfaces.

2. A self-adhering underlayment as described in claim 1, wherein:
   the first top layer is comprised of a mixture of: (a) 5% to 25% polypropylene modifiers comprised of isotactic polypropylene, ethylene-propylene copolymer, atactic polypropylene and polyethylene, (b) 8% to 70% of filler, and (c) 45% to 75% asphalt; and
   the second bottom layer of heat-and-pressure activated self-adhesive compound is comprised of a mixture of: (a) 3% to 10% styrene-butadiene-styrene copolymer, (b) 4% to 11% styrene-isoprene-styrene copolymer, (c) 20% to 33% hydrocarbon tackifying resins, and (d) remainder asphalt.

3. A self-adhering underlayment as described in claim 2, wherein:
   the hydrocarbon tackifying resins in the bottom layer compound is primarily Polyvinyl Butyral.

4. A self-adhering underlayment as described in claim 3, wherein:
   the bottom layer compound comprises: (a) 3% to 10% styrene-butadiene-styrene copolymer, (b) 0% to 5% styrene-isoprene-styrene copolymer, (c) 6% to 25% hydrocarbon tackifying resins, (d) 8% to 40% mineral stabilizers, and (e) remainder asphalt.

5. A self-adhering underlayment as described in claim 1, wherein:
   said filler is selected from the group consisting of: limestone, talc, fly ash, volcanic ash, graphite, carbon black, silica, china clay, fire retardants and combinations thereof.

6. A self-adhering underlayment for metal roofing assemblies comprising:
- a dual-compound composite sheet having a carrier sheet with a front side and a back side, the carrier sheet being sandwiched between a top layer and a bottom layer:
- the top layer comprised of a mixture of: (a) polypropylene modifiers comprised of isotactic polypropylene, ethylene-propylene copolymer, atactic polypropylene and polyethylene, (b) filler, and (c) asphalt;
- the bottom layer comprised of self-adhesive compound comprised of a mixture of: (a) styrene-butadiene-styrene copolymer, (b) styrene-isoprene-styrene copolymer, (c) hydrocarbon tackifying resins, and (d) asphalt; and
- the top and bottom layers forming oppositely facing upper and lower surfaces;
- the top layer compound further contains a fire retardant filler additive selected from the group consisting of calcium borate, magnesium borate, a mixture of antimony tri-oxide and deca bromo diphenyl oxide,
- said filler being selected from the group consisting of: limestone, talc, fly ash, volcanic ash, graphite, carbon black, silica, china clay, fire retardants and combinations thereof.

7. A self-adhering underlayment as described in claim 1, wherein:
- the Atactic Polypropylene top layer compound contains a tackifying resin.

8. A self-adhering underlayment as described in claim 1, wherein:
- a surfacing agent is at least partly imbedded in the upper surface of the composite providing said upper surface with resistance to skidding.

9. A self-adhering underlayment for metal roofing assemblies comprising:
- a dual-compound composite sheet having a carrier sheet with a front side and a back side, the carrier sheet being sandwiched between a top layer and a bottom layer:
- the top layer comprised of a mixture of: (a) polypropylene modifiers comprised of isotactic polypropylene, ethylene-propylene copolymer, atactic polypropylene and polyethylene, (b) filler, and (c) asphalt;
- the bottom layer comprised self-adhesive compound comprised of a mixture of: (a) styrene-butadiene-styrene copolymer, (b) styrene-isoprene-styrene copolymer, (c) hydrocarbon tackifying resins, and (d) asphalt; and
- the top and bottom layers forming oppositely facing upper and lower surfaces;
- a surfacing agent is at least partly imbedded in the upper surface of the composite providing said upper surface with resistance to skidding, the surfacing agent being a fabric selected from the group consisting of non-woven polypropylene, stitch-bonded polyester and a film carried by the upper surface of the top.

10. A self-adhering underlayment for metal roofing assemblies comprising:
- a dual-compound composite sheet having a carrier sheet with a front side and a back side, the carrier sheet being sandwiched between a top layer and a bottom layer:
- the top layer comprised of a mixture of: (a) polypropylene modifiers comprised of isotactic polypropylene, ethylene-propylene copolymer, atactic polypropylene and polyethylene, (b) filler, and (c) asphalt;
- the bottom layer comprised of self-adhesive compound comprised of a mixture of: (a) styrene-butadiene-styrene copolymer, (b) styrene-isoprene-styrene copolymer, (c) hydrocarbon tackifying resins, and (d) asphalt; and
- the top and bottom layers forming oppositely facing upper and lower surfaces;
- a surfacing agent is at least partly imbedded in the upper surface of the composite providing said upper surface with resistance to skidding,
- the surfacing agent being a polyolefinic film having anti-skid surface treatment and high temperature resistance.

11. A self-adhering underlayment as described in claim 1, wherein:
- a release liner having a contact and non-contact surface is applied to the lower surface of the composite; and
- the release liner is a polyester, polypropylene or polyethylene film having a siliconized contact surface and a white color non-contact surface.

12. A self-adhering underlayment for metal roofing assemblies comprising:
- a dual-compound composite sheet having a carrier sheet with a front side and a back side, the carrier sheet being sandwiched between a top layer and a bottom layer:
- the top layer comprised of a mixture of: (a) polypropylene modifiers comprised of isotactic polypropylene, ethylene-propylene copolymer, atactic polypropylene and polyethylene, (b) filler, and (c) asphalt;
- the bottom layer comprised of self-adhesive compound comprised of a mixture of: (a) styrene-butadiene-styrene copolymer, (b) styrene-isoprene-styrene copolymer, (c) hydrocarbon tackifying resins, and (d) asphalt;
- the top and bottom layers forming oppositely facing upper and lower surfaces;
- a side lap having a width of 3 inches to 4 inches runs longitudinally along one lengthwise edge of the composite; and
- an end lap having a width of 4 inches to 6 inches runs widthwise along one end of the composite.

13. A self-adhering underlayment as described in claim 12, wherein:
- a release film is applied to the side lap and end lap.

14. A self-adhering underlayment as described in claim 1, wherein:
- a surfacing agent comprised of fabric surfacing is at least partly imbedded in the upper surface of the composite.

15. A self-adhering underlayment as described in claim 1, wherein:
- a surfacing agent comprised of film surfacing is at least partly imbedded in the upper surface of the composite in areas other than said side and end laps.

16. A self-adhering underlayment as described in claim 1, wherein:
- said carrier is made of polyester.

17. A self-adhering underlayment as described in claim 1, wherein:
- said carrier is made of fiberglass.

18. A self-adhering underlayment as described in claim 1, wherein:
- said carrier is made of a material selected from the group consisting of polyester and fiberglass and a combination of polyester and fiberglass.

19. A self-adhering underlayment for metal roofing assemblies comprising:
- a composite having a carrier sheet with a front side and a back side, the carrier sheet being sandwiched between a top layer and a bottom layer:

the top layer comprised of a mixture of: (a) 0% to 25% polypropylene modifiers comprised of isotactic polypropylene, ethylene-propylene copolymer, atactic polypropylene and polyethylene, (b) 8% to 70% of filler, and (c) 45% to 75% bitumen;

the bottom layer comprised of heat-and-pressure activated self-adhesive compound comprised of a mixture of: (a) 3% to 10% styrene-butadiene-styrene copolymer, (b) 0% to 11% styrene-isoprene-styrene copolymer, (c) 6% to 33% hydrocarbon tackifying resins, (d) 0% to 40% mineral stabilizers, and (e) remainder asphalt; and the top and bottom layers forming oppositely upper and lower surfaces.

20. A self-adhering underlayment as described in claim 19, wherein:

the hydrocarbon tackifying resins in the bottom layer compound is primarily Polyvinyl Butyral.

21. A self-adhering underlayment as described in claim 19, wherein:

the bottom layer compound comprises: (a) 3% to 10% styrene-butadiene-styrene copolymer, (b) 0% to 5% styrene-isoprene-styrene copolymer, (c) 6% to 25% hydrocarbon tackifying resins, (d) 8% to 40% mineral stabilizers, and (e) remainder asphalt.

22. A self-adhering underlayment as described in claim 19, wherein:

said filler is selected from the group consisting of: limestone, talc, fly ash, volcanic ash, graphite, carbon black, silica, china clay, fire retardants and combinations thereof.

23. A self-adhering underlayment for metal roofing assemblies comprising:

a composite having a carrier sheet with a front side and a back side, the carrier sheet being sandwiched between a top layer and a bottom layer:

the top layer comprised of a mixture of: (a) 0% to 25% polypropylene modifiers comprised of isotactic polypropylene, ethylene-propylene copolymer, atactic polypropylene and polyethylene, (b) 8% to 70% of filler, and (c) 45% to 75% bitumen;

the bottom layer comprised self-adhesive compound comprised of a mixture of: (a) 3% to 10% styrene-butadiene-styrene copolymer, (b) 0% to 11% styrene-isoprene-styrene copolymer, (c) 6% to 33% hydrocarbon tackifying resins, (d) 0% to 40% mineral stabilizers, and (e) remainder asphalt; and the top and bottom layers forming oppositely upper and lower surfaces;

the hydrocarbon tackifying resins in the bottom layer compound is primarily Polyvinyl Butyral;

the top layer compound further containing a fire retardant filler additive selected from the group consisting of calcium borate, magnesium borate, a mixture of antimony tri-oxide and deca bromo diphenyl oxide.

24. A self-adhering underlayment as described in claim 19, wherein:

the Atactic Polypropylene top layer compound contains a tackifying resin.

25. A self-adhering underlayment as described in claim 19, wherein:

a surfacing agent is at least partly imbedded in the upper surface of the composite providing said upper surface with resistance to skidding.

26. A self-adhering underlayment as described in claim 25, wherein:

the surfacing agent is a fabric.

27. A self-adhering underlayment as described in claim 25, wherein:

the surfacing agent is film.

28. A self-adhering underlayment as described in claim 19, wherein:

a release liner having a contact and non-contact surface is applied to the lower surface of the composite; and the release liner is a polyester, polypropylene or polyethylene film having a siliconized contact surface and a white color non-contact surface.

29. A self-adhering underlayment for metal roofing assemblies comprising:

a composite having a carrier sheet with a front side and a back side, the carrier sheet being sandwiched between a top layer and a bottom layer:

the top layer comprised of a mixture of: (a) 0% to 25% polypropylene modifiers comprised of isotactic polypropylene, ethylene-propylene copolymer, atactic polypropylene and polyethylene, (b) 8% to 70% of filler, and (c) 45% to 75% bitumen;

the bottom layer comprised self-adhesive compound comprised of a mixture of: (a) 3% to 10% styrene-butadiene-styrene copolymer, (b) 0% to 11% styrene-isoprene-styrene copolymer, (c) 6% to 33% hydrocarbon tackifying resins, (d) 0% to 40% mineral stabilizers, and (e) remainder asphalt; and the top and bottom layers forming oppositely upper and lower surfaces;

the hydrocarbon tackifying resins in the bottom layer compound is primarily Polyvinyl Butyral;

the top layer compound further containing a fire retardant filler additive selected from the group consisting of calcium borate, magnesium borate, a mixture of antimony tri-oxide and deca bromo diphenyl oxide.

a side lap having a width of 3 inches to 4 inches runs longitudinally along one lengthwise edge of the composite; and an end lap having a width of 4 inches to 6 inches runs widthwise along one end of the composite.

30. A self-adhering underlayment as described in claim 29, wherein:

a release film is applied to the side lap and end lap.

31. A self-adhering underlayment as described in claim 19, wherein:

a surfacing agent comprised of a granular material is partly imbedded in the upper surface of the composite in areas other than said side and end laps.

32. A self-adhering underlayment as described in claim 19, wherein:

said carrier is made of polyester.

33. A self-adhering underlayment as described in claim 19, wherein:

said carrier is made of fiberglass.

34. A self-adhering underlayment as described in claim 19, wherein:

said carrier is made of a material selected from the group consisting of polyester and fiberglass and a combination of polyester and fiberglass.

35. A self-adhering underlayment for metal roofing assemblies comprising:

a dual-compound composite sheet having a carrier sheet with a front side and a back side, the carrier sheet being sandwiched between a top layer and a bottom layer:

the top layer comprised of a mixture of: (a) polypropylene modifiers comprised of isotactic polypropylene, ethylene-propylene copolymer, atactic polypropylene and polyethylene, (b) filler, and (c) asphalt;

the bottom layer comprised of heat-and-pressure activated self-adhesive compound comprised of a mixture of: (a) styrene-butadiene-styrene copolymer, (b) styrene-isoprene-styrene copolymer, (c) hydrocarbon tackifying resins, and (d) asphalt; and said filler being comprised of a material selected from the group consisting of: limestone, talc, fly ash, volcanic ash, graphite, carbon black, silica, china clay, fire retardants and combinations thereof, said top layer having non-woven polypropylene fabric at least partly imbedded in the upper surface of the composite providing said upper surface with resistance to skidding, a release liner applied to the lower surface of the composite; and a side lap running longitudinally along one lengthwise edge of the top layer of the composite; and a release film applied to the side lap and end lap, and said a surfacing agent being partly imbedded in the upper surface of the composite in areas other than said side and end laps said carrier being made of a material selected from the group consisting of polyester and fiberglass and a combination of polyester and fiberglass.

36. A self-adhering underlayment as described in claim 35, wherein:

the top layer compound further being comprised of at least one fire retardant filler additives selected from the group consisting of calcium borate, magnesium borate, a mixture of antimony tri-oxide and deca bromo diphenyl oxide.

37. A self-adhering underlayment as described in claim 35, wherein:

the top layer compound is further comprised of tackifying resins.

38. A self-adhering underlayment as described in claim 35, wherein:

the top layer compound is further comprised of 0% to 2% tackifying resin.

39. A self-adhering underlayment as described in claim 35, wherein:

the release liner is a polyester, polypropylene or polyethylene film having a siliconized contact surface and a white color non-contact surface.

* * * * *